US012646318B2

(12) United States Patent
Boiarov et al.

(10) Patent No.: US 12,646,318 B2
(45) Date of Patent: Jun. 2, 2026

(54) SYSTEM AND METHOD FOR FAST ADAPTIVE BRANDS LOGOS DETECTION ON VIDEO WITH OPEN SET APPROACH

(71) Applicants: Constructor Technology AG, Schaffhausen (CH); Constructor Education and Research Genossenschaft, Schaffhausen (CH)

(72) Inventors: Andrei Boiarov, Sofia (BG); Ilya Shimchik, Istanbul (TR); Nikita Firsakov, Istanbul (TR); Pavlo Bredikhin, Kharkov (UA); Sergey Ulasen, Singapore (SG); Serg Bell, Singapore (SG); Stanislav Protasov, Singapore (SG); Nikolay Dobrovolskiy, Sofia (BG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 533 days.

(21) Appl. No.: 18/173,779

(22) Filed: Feb. 23, 2023

(65) Prior Publication Data
US 2024/0290093 A1    Aug. 29, 2024

(51) Int. Cl.
*G06V 20/40* (2022.01)
*G06V 10/774* (2022.01)
(Continued)

(52) U.S. Cl.
CPC ........... *G06V 20/41* (2022.01); *G06V 10/774* (2022.01); *G06V 10/945* (2022.01); *G06V 20/48* (2022.01);
(Continued)

(58) Field of Classification Search
CPC ..... G06V 20/41; G06V 20/70; G06V 2201/09
See application file for complete search history.

(56) References Cited

U.S. PATENT DOCUMENTS

2016/0227277 A1* 8/2016 Schlesinger ..... H04N 21/44218
2020/0372662 A1* 11/2020 Pereira ................ G06V 10/764
(Continued)

FOREIGN PATENT DOCUMENTS

CN        110837615 A      2/2020
IN      201941004531 A      8/2020
WO    WO2021194090 A1      9/2021

OTHER PUBLICATIONS

Fehérvári, I., & Appalaraju, S. (Jan. 2019). Scalable logo recognition using proxies. In 2019 IEEE Winter Conference on Applications of Computer Vision (WACV) (pp. 715-725). IEEE. (Year: 2019).*

(Continued)

*Primary Examiner* — Bobbak Safaipour
*Assistant Examiner* — Ashley Hytrek
(74) *Attorney, Agent, or Firm* — ESPE Legal Consultancy FZ-LLC

(57) ABSTRACT

A system and method for performing brand detection in a video is disclosed herein. The method comprises receiving the video for performing the brand detection thereon; splitting the video for obtaining a plurality of video frames; performing an open set detection on each input video frame from the plurality of video frames, which comprises proposing one or more bounding boxes on the input video frames on regions of the video frame that potentially include brand media; cropping the one or more bounding boxes; providing the cropped bounding boxes to a classification module for obtaining embedding vectors corresponding to each of the cropped bounding boxes; and comparing the embedding vectors of the cropped bounding boxes with (Continued)

embedding vectors of one or more brand reference images provided by a user for computing instances of brand detection in each video frame of the plurality of video frames.

16 Claims, 3 Drawing Sheets

(51) Int. Cl.
  *G06V 10/94*          (2022.01)
  *G06V 20/70*          (2022.01)
(52) U.S. Cl.
  CPC .............. *G06V 20/49* (2022.01); *G06V 20/70* (2022.01); *G06V 20/44* (2022.01); *G06V 2201/09* (2022.01)

(56)                    References Cited

U.S. PATENT DOCUMENTS

| | | | |
|---|---|---|---|
| 2022/0129911 A1* | 4/2022 | Gabale | G06Q 30/018 |
| 2023/0353839 A1* | 11/2023 | Chun | G06Q 30/02 |
| 2025/0029170 A1* | 1/2025 | Chachek | H04W 4/024 |

OTHER PUBLICATIONS

Su, J. C., Maji, S., & Hariharan, B. (Aug. 2020). When does self-supervision improve few-shot learning?. In European conference on computer vision (pp. 645-666). Cham: Springer International Publishing. (Year: 2020).*

Ermakov, M., & Makarov, I. (Nov. 2022). Few-shot logo recognition in the wild. In 2022 IEEE 22nd International Symposium on Computational Intelligence and Informatics and 8th IEEE (CINTI-MACRo) (pp. 000393-000398). IEEE. (Year: 2022).*

Tüzkö, A., Herrmann, C., Manger, D., & Beyerer, J. (2017). Open set logo detection and retrieval. arXiv preprint arXiv:1710.10891. (Year: 2017).*

Li, C., Fehervari, I., Zhao, X., Macedo, I., & Appalaraju, S. (Jan. 2022). SeeTek: Very Large-Scale Open-set Logo Recognition with Text-Aware Metric Learning. In 2022 IEEE/CVF Winter Conference on Applications of Computer Vision (WACV) (pp. 587-596). IEEE Computer Society. (Year: 2022).*

Dong Wu, et al. YOLOP:YouOnlyLookOnceforPanopticDrivingPerception, Mar. 26, 2022, 2108.11250.pdf.

Chenge Li, et.al. See Tek: Very Large-Scale Open-set Logo Recognition with Text-Aware Metric Learning, 2022, Li SeeTek.pdf.

Olaf Ronneberger, et al. U-Net: Convolutional Networks for Biomedical Image Segmentation, May 18, 2015, 1505.04597.pdf.

Christoph Feichtenhofer, et al. SlowFast Networks for Video Recognition, Oct Oct. 29, 2019, 1812.03982.pdf.

Haoqi Fan, et al. Multiscale Vision Transformers, 2021, Fan_Multiscale_Vision_Transformers_ICCV_2021_paper.pdf.

Jake Snell, et al. Prototypical Networks for Few-shot Learning, Jun. 19, 2017, 1703.05175.pdf.

Prannay Khosla, et al. Supervised Contrastive Learning, Mar. 10, 2021, 2004.11362.pdf.

* cited by examiner

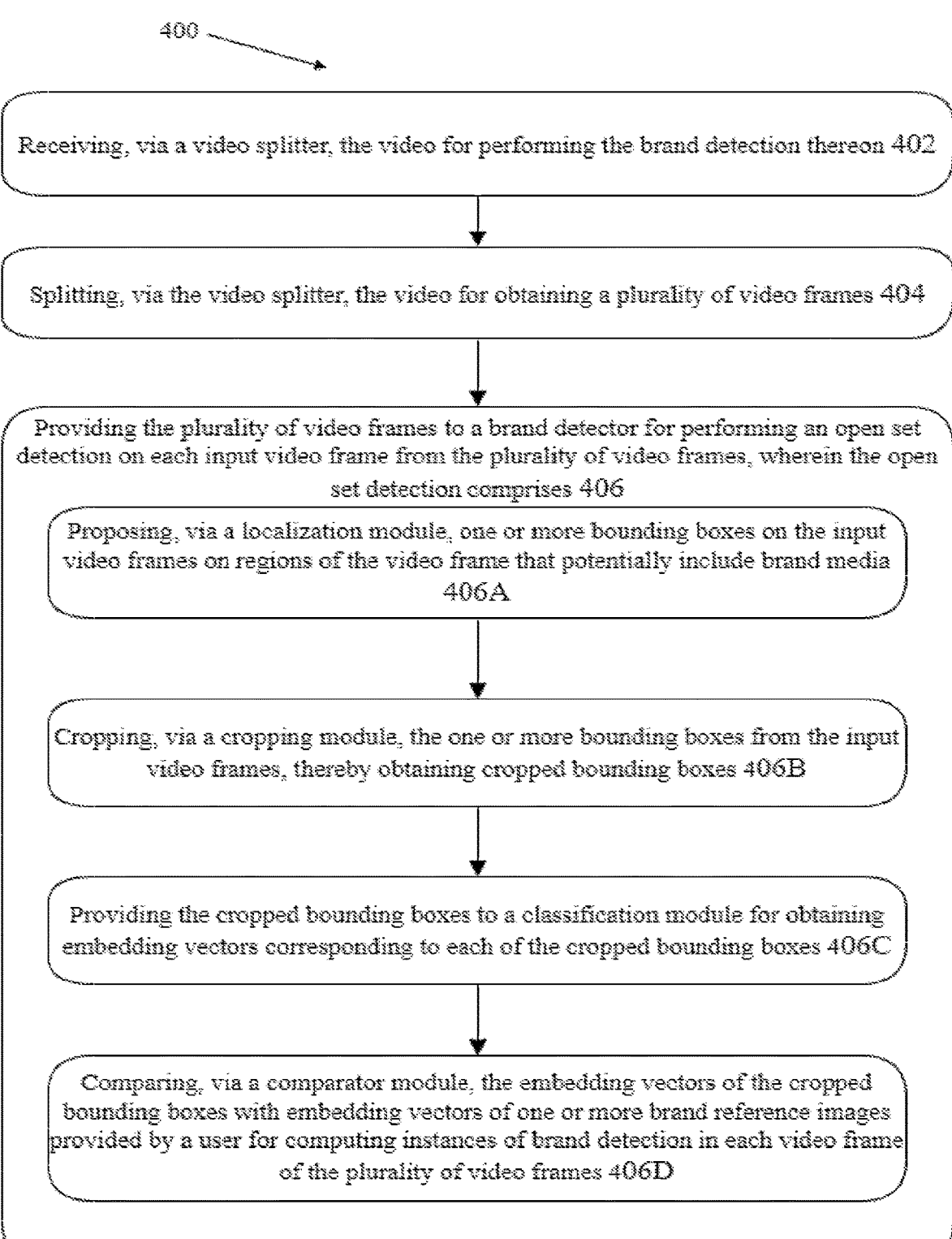

400 —

Receiving, via a video splitter, the video for performing the brand detection thereon 402

Splitting, via the video splitter, the video for obtaining a plurality of video frames 404

Providing the plurality of video frames to a brand detector for performing an open set detection on each input video frame from the plurality of video frames, wherein the open set detection comprises 406

Proposing, via a localization module, one or more bounding boxes on the input video frames on regions of the video frame that potentially include brand media 406A Cropping, via a cropping module, the one or more bounding boxes from the input video frames, thereby obtaining cropped bounding boxes 406B Providing the cropped bounding boxes to a classification module for obtaining embedding vectors corresponding to each of the cropped bounding boxes 406C Comparing, via a comparator module, the embedding vectors of the cropped bounding boxes with embedding vectors of one or more brand reference images provided by a user for computing instances of brand detection in each video frame of the plurality of video frames 406D

Figure 4

SYSTEM AND METHOD FOR FAST ADAPTIVE BRANDS LOGOS DETECTION ON VIDEO WITH OPEN SET APPROACH

FIELD OF THE INVENTION

The present disclosure generally relates to video processing. In particular, the present disclosure relates to a system and method for fast and adaptive brand logo detection on video, which incorporates an open set approach.

BACKGROUND OF THE INVENTION

Object detection in images and videos is one of the popular areas of technology development and is widely used in many applications, including television, surveillance systems, media, personal identification, and other areas. Depending upon the application where object detection is being used, the methodologies behind object detection differ from each other in the principles of training machine vision models. Different training machine vision models have a number of disadvantages when trying to use them in the field of video analysis to identify certain objects, in particular logos. Detection of advertising banners, logos, and other advertising media in a video stream is an urgent business requirement. Such detection makes it possible to effectively evaluate the effectiveness of marketing programs and introduce a new type of advertising monetization method, for example, on television or on online video hosting sites.

Conventional tools and methods allow the detection of logos only if a machine vision model is trained on samples of these logos, which is often inconvenient for end users. Another disadvantage of conventional systems is the speed of adding new logos for detection, as this is associated with the process of retraining the machine learning model. Such a process of retraining can take from several hours to several days, depending on the complexity of the image and the final detection accuracy.

There is a need for a video processing system that does not need to be trained by marking frames indicating the presence of a particular brand or advertisement on a given frame. Further, there is a need for a video processing system with the ability to quickly add new or modified objects for detection, such as company logos, product names, and the like.

SUMMARY OF THE INVENTION

The present disclosure envisages a method for performing brand detection in a video. The method comprises receiving, by a video splitter, the video for performing the brand detection thereon; splitting, by the video splitter, the video for obtaining a plurality of video frames; and providing the plurality of video frames to a brand detector for performing an open set detection on each input video frame from the plurality of video frames. The open set detection comprises proposing, by a localization module, one or more bounding boxes on the input video frames on regions of the video frame that potentially include brand media; cropping, by a cropping module, the one or more bounding boxes from the input video frames, thereby obtaining cropped bounding boxes; providing the cropped bounding boxes to a classification module for obtaining embedding vectors corresponding to each of the cropped bounding boxes; and comparing, by a comparator module, the embedding vectors of the cropped bounding boxes with embedding vectors of one or more brand reference images provided by a user for computing instances of brand detection in each video frame of the plurality of video frames.

In one embodiment, the brand media and the brand reference images include brand logos, brand taglines, and brand ambassador images.

In one embodiment, the method further comprises training the classification module in an open set approach using self-supervised learning (Supervised Contrastive learning) and few-shot learning.

In one embodiment, the method further comprises determining an exact square region in which a brand logo is occupied within the cropped bounding boxes by a semantic segmentation model.

In one embodiment, the method further comprises resolving a scene understanding task by the semantic segmentation model.

In one embodiment, the method further comprises detecting if the brand reference image appears in the video at a crucial moment by a video action recognition module.

In one embodiment, the method further comprises identifying if the brand reference image appears onto an area on a screen where a user's attention is focused by the video action recognition model.

In one embodiment, the method further comprises allowing the user to label new brand reference images in the video frames for retraining the classification module, thereby facilitating their detection.

In one embodiment, the method further comprises allowing the user to provide new brand reference images for retraining the classification module, thereby facilitating their detection.

In one embodiment, the method further comprises computing, by a brand appearance computing unit, one or more parameters associated with reach per-brand appearance statistics.

The present disclosure also envisages a system for performing brand detection in a video. The system comprises a video splitter to receive the video for performing the brand detection and configured to split the video for obtaining a plurality of video frames; and a brand detector for performing an open set detection on each input video frame from the plurality of video frames. The brand detector comprises a localization module to propose one or more bounding boxes on the input video frames on regions of the video frame that potentially include a brand media; a cropping module to crop the one or more bounding boxes from the input video frames to obtain cropped bounding boxes; a classification module to receive the cropped bounding boxes for obtaining embedding vectors corresponding to each of the cropped bounding boxes; and a comparator module to compare the embedding vectors of the cropped bounding boxes with embedding vectors of one or more brand reference images provided by a user for computing instances of brand detection in each video frame of the plurality of video frames.

In one embodiment, the brand media and the brand reference images include brand logos, brand taglines, and brand ambassador images.

In one embodiment, the classification module is trained in an open set approach using self-supervised learning (Supervised Contrastive learning) and few-shot learning.

In one embodiment, the system further comprises a semantic segmentation model to determine an exact square region in which a brand logo is occupied within the cropped bounding boxes. In one embodiment, the semantic segmentation model is configured to perform a scene understanding task.

In one embodiment, the system further comprises a video action-recognition module to detect if the brand reference image appears in the video at a crucial moment. In one embodiment, the video action recognition model is further configured to identify if the brand reference image appears onto an area on a screen where a user's attention is focused.

In one embodiment, the system further comprises a user interface to allow the user to label new brand reference images in the video frames for retraining the classification module, thereby facilitating detection thereof.

In one embodiment, the user interface is further configured to allow the user to provide new brand reference images for retraining the classification module, thereby facilitating detection thereof.

In one embodiment, the system further comprises a brand appearance computing unit to compute one or more parameters associated with reach per-brand appearance statistics.

DESCRIPTION OF THE DRAWINGS

FIG. 4 shows a block diagram of a method for performing brand detection in a video, in accordance with an embodiment of the present disclosure.

DETAILED DESCRIPTION

The present disclosure envisages a system and a method performing brand detection in a video. In accordance with one embodiment of the present disclosure, a user imports the required video into the system. The system may be configured as an application that can be executed on any smart device. The system then creates a new project for the video, wherein the user is prompted to use a pre-trained model or a no-model option within the system for detecting the brands of interest from the video. In one example, the output of the system can be per-frame brand detections. In one implementation, the users can also add new brand examples to re-train the system, for example, by labeling new brands on video frames or by providing brand logos of brands of interest as reference images. Video frames comprise a single image in a sequence of pictures.

Figure 1:
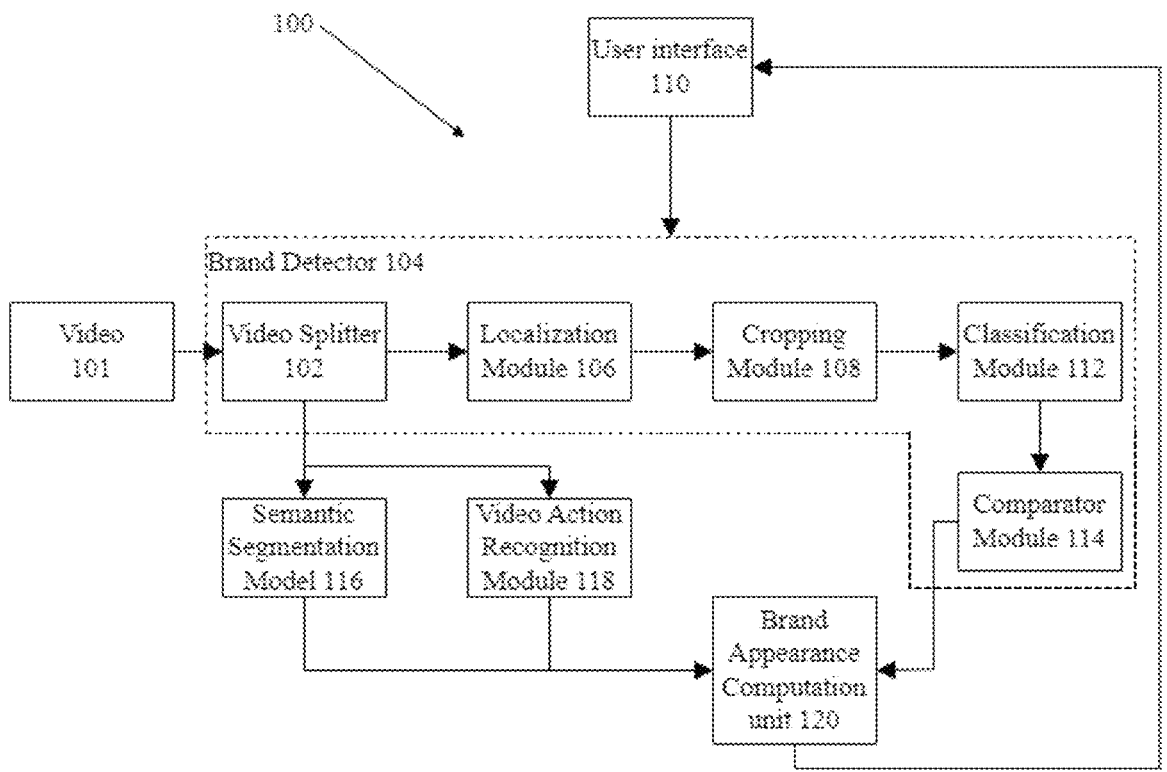
FIG. 1 shows a block diagram of a system for performing brand detection in a video, in accordance with an embodiment of the present disclosure.

FIG. 1 shows a block diagram of a system 100 for performing brand detection in a video 101 in accordance with an embodiment of the present disclosure. The system 100 comprises a video splitter 102 to receive video 101 for performing the brand detection thereon. The video splitter 102 is configured to split the video 101 for obtaining a plurality of video frames. The system 100 further comprises a brand detector 104 for performing an open set detection on each input video frame from the plurality of video frames. Open set detection describes the task of detecting brand media from input video frames without the use of a model pre-trained on frames containing target brand media. Closed set detection refers to the task of detecting brand media from input video frames with the use of a model pre-trained on frames containing target brand media.

Figure 2:
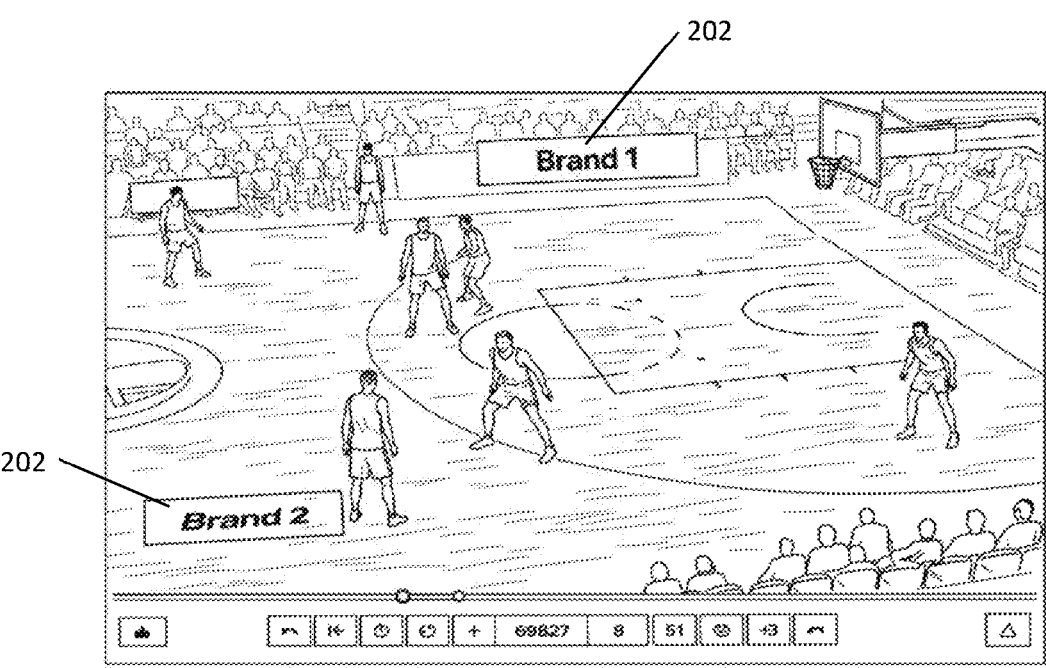
FIG. 2 shows an image of a basketball game where bounding boxes are provided on the brands of interest, in accordance with an embodiment of the present disclosure.

The brand detector 104 comprises a localization module 106 to propose one or more bounding boxes on the input video frames on regions of the video frame that potentially include a brand media. In one embodiment, the brand media can include brand logos, brand taglines, and brand ambassador images. An example of bounding boxes can be seen in FIG. 2, wherein FIG. 2 depicts an image of a basketball game where bounding boxes 202 are provided on the brands of interest.

The brand detector 104 further comprises a cropping module 108 to crop the one or more bounding boxes from the input video frames, thereby obtaining cropped bounding boxes. In one embodiment, only those bounding boxes are cropped that are of interest to the user. More specifically, the system 100 comprises a user-interface 110 for allowing the user to perform a number of tasks such as interacting with the brand detector 104 and providing to the brand detector 104 information of brands of interest, wherein such information can include brand logos, brand taglines, and brand ambassador images.

The brand detector 104 further comprises a classification module 112 to receive the cropped bounding boxes for obtaining embedding vectors corresponding to each of the cropped bounding boxes. These are the embedding vectors of all those brand media that are of interest to the user. The embedding vectors of the cropped bounding boxes are generated for performing a comparison with embedding vectors of the brand reference images that are provided by the user. In one embodiment, the brand reference images include brand logos, brand taglines, and brand ambassador images. More specifically, the classification module 112 can be configured to create the embedding vectors of the reference brand images that are provided by the user through user interface 110. These can be considered as reference embedding vectors belonging to the brands of interest for the user. In one embodiment, the classification module 112 is trained in an open set approach using self-supervised learning (Supervised Contrastive Learning) and few-shot learning.

The brand detector 104 further comprises a comparator module 114 to compare the embedding vectors of the cropped bounding boxes with the reference embedding vectors of one or more brand reference images provided by the user for computing instances of brand detection in each video frame of the plurality of video frames.

In one embodiment, the system 100 further comprises a semantic segmentation model 116 to determine an exact square region in which a brand logo is occupied within the cropped bounding boxes. In one embodiment, the semantic segmentation model 116 is configured to perform a scene understanding task. A scene understanding task comprises classifying each pixel on the frame by types of places, e.g., LED screen, floor, platform edge, field, etc. In an embodiment, U-Net, DINO, and Panoptic-DeepLab approaches are used as semantic segmentation models for scene understanding.

In one embodiment, the system 100 further comprises a video action recognition module 118 to detect if the brand reference image appears in the video at a crucial moment. For example, a crucial moment in a football match can be the moment when a goal is scored. For detection of the important moments in the video, video action recognition models such as deep 3D convolutional neural networks (SlowFast R101) or Video transformers (MViT) can also be used. In one embodiment, the video action recognition model 118 is further configured to identify the brand reference image appearing onto an area on a screen where a user's attention is focused. In one example, the estimation of the user attention field can be identified by video action recognition models such as Class Activation Maps.

In one embodiment, the system 100 further comprises a brand appearance computing unit 120 to compute one or more parameters associated with reach per-brand appearance statistics. In an embodiment, the one or more parameters can include mean square on the screen, exposure, landing (on what advertising place the brand appeared), duration of the brand presence in the user attention field, and so on. The values of these parameters can be used to calculate brand advertising values, and the same can be displayed to the user by user interface 110.

Figure 3:
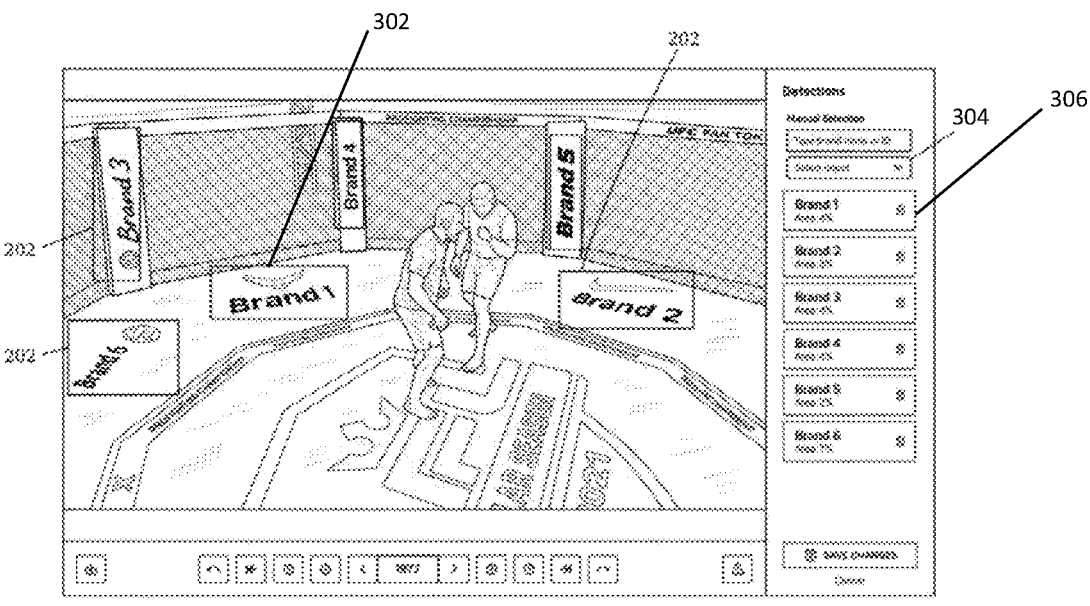
FIG. 3 shows an image of a mixed martial arts match, wherein the feature of labeling a new brand is depicted, in accordance with an embodiment of the present disclosure.

In one embodiment, the user interface 110 allows the user to label new brand reference images in the video frames for retraining the classification module, thereby facilitating image detection. FIG. 3 shows an image of a mixed martial arts match, wherein the feature of labeling a new brand is depicted, in accordance with an embodiment of the present disclosure. More specifically, the user interface 110 is such that it allows the user to select a bounding box 302, wherein the bounding box 302 can be the bounding box containing the image of the new brand of interest regarding which the system 100 is retrained. Tabs 304, 306 allow the user to provide details of the new brand bound by the bounding box 302. This feature is an example of the closed set approach utilization in the system 100 of the present disclosure.

Alternatively, the user interface can be configured to allow the user to provide new brand reference images for retraining the classification module 112, thereby facilitating image detection. This feature is an example of the open set approach utilization in the system 100 of the present disclosure. Therefore, using the user interface 110, the system 100 can be trained on the fly regarding the detection of only those brands that are of interest to the user. As such, the training of the system 100 of the present disclosure can be restricted to only detect the brands of interest, thereby eliminating the need of investing significant time and resources in training a conventional closed set detection model, wherein the conventional closed set detection model is required to be trained for numerous brands majority of which will not be of interest to the user.

FIG. 4 shows method 400 for performing brand detection in a video 101 in accordance with an embodiment of the present disclosure.

At block 402, the method 400 comprises receiving, by a video splitter 102, the video for performing the brand detection thereon.

At block 404, the method 400 comprises splitting, by the video splitter 102, the video for obtaining a plurality of video frames.

At block 406, the method 400 comprises providing the plurality of video frames to a brand detector 104 for performing an open set detection on each input video frame from the plurality of video frames.

At block 406A, the method 400 comprises proposing, by a localization module 106, one or more bounding boxes on the input video frames on regions of the video frame that potentially include brand media. In an embodiment, the brand media includes brand logos, brand taglines, and brand ambassador images. An example of bounding boxes can be seen in FIG. 2, wherein FIG. 2 depicts an image of a basketball game where bounding boxes 202 are provided on the brands of interest.

At block 406B, the method 400 comprises cropping, by a cropping module 108, the one or more bounding boxes from the input video frames, thereby obtaining cropped bounding boxes. In one embodiment, only those bounding boxes are cropped that are of interest to the user. More specifically, the method comprises allowing the user to perform a number of tasks, by a user interface 110, such as interacting with the brand detector 104 and providing to the brand detector 104 information of brands of interest, wherein such information can include brand logos, brand taglines, and brand ambassador images.

At block 406C, the method 400 comprises providing the cropped bounding boxes to a classification module 112 for obtaining embedding vectors corresponding to each of the cropped bounding boxes. These are the embedding vectors of all those brand media that are of interest to the user. The embedding vectors of the cropped bounding boxes are generated for performing comparison with embedding vectors of the brand reference images that are provided by the user. In one embodiment, the brand reference images include brand logos, brand taglines, and brand ambassador images. More specifically, the classification module 112 can be configured to create the embedding vectors of the reference brand images that are provided by the user by the user interface 110. These can be considered as reference embedding vectors belonging to the brands of interest for the user. In one embodiment, the classification module 112 is trained in an open set approach using self-supervised learning (Supervised Contrastive learning) and few-shot learning.

At block 406D, the method 400 comprises comparing, by a comparator module 114, the embedding vectors of the cropped bounding boxes with embedding vectors of the one or more brand reference images provided by the user for computing instances of brand detection in each video frame of the plurality of video frames.

In one embodiment, the method 400 further comprises determining an exact square region in which a brand logo is occupied within the cropped bounding boxes by a semantic segmentation model 116. In one embodiment, the method 400 further comprises resolving a scene understanding task by the semantic segmentation model 116. Scene understanding task comprises classifying each pixel on the frame by types of places, e.g., LED screen, floor, platform edge, field, etc. In an embodiment, U-Net, DINO, and Panoptic-Deep-Lab approaches can be used as semantic segmentation models for scene understanding.

In one embodiment, the method 400 further comprises detecting if the brand reference image appears in the video at a crucial moment by a video action recognition module. For example, a crucial moment in a football match can be the moment when a goal is scored. For detection of the important moments in the video, video action recognition models such as deep 3D convolutional neural networks (SlowFast R101) or Video transformers (MViT) are used.

In one embodiment, the method 400 further comprises identifying the brand reference image appearing onto an area on a screen where a user's attention is focused by the video action recognition model. In one example, the estimation of the user attention field can be identified by video action recognition models such as Class Activation Maps.

In one embodiment, the method 400 further comprises allowing the user to label new brand reference images in the video frames for retraining the classification module, thereby facilitating image detection. This feature is an example of closed set approach utilization . . . . In another embodiment, the method 400 further comprises allowing the user to provide new brand reference images for retraining the classification module, thereby facilitating image detection. This feature is an example of the open set approach utilization.

User interface 110 facilitates on-the-fly training for improving detection of only those brands that are of interest to the user. Training can be restricted to detect only brands of interest, thereby eliminating the need of investing significant time and resources in training a conventional closed set detection model, where the conventional closed set detection model must be trained for numerous brands that will not be of interest to the user.

In one embodiment, the method 400 further comprises computing, by a brand appearance computing unit 120, one or more parameters associated with reach per-brand appearance statistics. In an embodiment, the one or more parameters including mean square on the screen, exposure, landing (on what advertising place the brand appeared), duration of the brand presence in the user attention field, and so on. The values of these parameters are used to calculate brands advertising values, and the values can be displayed to the user by the user interface 110.

The invention claimed is:

1. A method for performing brand detection in a video, the method comprising:

receiving the video with a video splitter;

splitting the video with the video splitter to obtain a plurality of video frames;

providing the plurality of video frames to a brand detector for performing open set detection on each input video frame from the plurality of video frames, wherein the open set detection comprises:

proposing, by a localization module one or more bounding boxes on the input video frames on regions of a video frame that potentially include brand media, cropping by a cropping module the one or more bounding boxes from the input video frames to obtain cropped bounding boxes, providing the cropped bounding boxes to a classification module to obtain embedding vectors corresponding to each of the cropped bounding boxes, and comparing, with a comparator module, the embedding vectors of the cropped bounding boxes with embedding vectors of one or more brand reference images provided by a user for computing instances of brand detection in each video frame of the plurality of video frames;

segmenting the brand media within the cropped bounding boxes by determining an exact region in which a brand logo is occupied within the cropped bounding boxes by a semantic segmentation model, wherein the exact region is only an area of the brand logo within the cropped bounding boxes; and computing, by a brand appearance computing unit, one or more parameters associated with per-brand, per-appearance statistics of the brand logo in the video using the comparing.

2. The method of claim 1, wherein the brand media and the one or more brand reference images include brand logos, brand taglines, and brand ambassador images.

3. The method of claim 1, further comprising training the classification module in an open set approach using self-supervised learning (Supervised Contrastive learning) and few-shot learning.

4. The method of claim 1, further comprising resolving a scene understanding task by the semantic segmentation model.

5. The method of claim 1, further comprising detecting whether the one or more brand reference images appear in the video at a crucial moment by a video action recognition module.

6. The method of claim 5, further comprising identifying whether the one or more brand reference images appear in an area of a screen where a user's attention is focused by the video action recognition module.

7. The method of claim 1, further comprising allowing the user to label new brand reference images in the video frames for retraining the classification module.

8. The method of claim 1, further comprising allowing the user to provide new brand reference images for retraining the classification module.

9. A system for performing brand detection in a video, the system comprising:

a video splitter to receive the video for performing the brand detection thereon, the video splitter configured to split the video to obtain a plurality of video frames;

a brand detector for performing an open set detection on each input video frame from the plurality of video frames, wherein the brand detector comprises:

a localization module to propose one or more bounding boxes on the input video frames on regions of a video frame that potentially include a brand media, a cropping module to crop the one or more bounding boxes from the input video frames to obtain cropped bounding boxes, a classification module to receive the cropped bounding boxes and obtaining embedding vectors corresponding to each of the cropped bounding boxes, and a comparator module to compare the embedding vectors of the cropped bounding boxes with embedding vectors of one or more brand reference images provided by a user for computing instances of brand detection in each video frame of the plurality of video frames;

a semantic segmentation model to determine an exact area occupied by a brand logo within the cropped bounding boxes, wherein the exact area is only an area of the brand logo within the cropped bounding boxes; and a brand appearance computing unit to compute one or more parameters associated with per-brand, per-appearance statistics of the brand logo in the video based on the comparing by the comparator module.

10. The system of claim 9, wherein the brand media and the one or more brand reference images include brand logos, brand taglines, and brand ambassador images.

11. The system of claim 9, wherein the classification module is trained in an open set approach using self-supervised learning (Supervised Contrastive learning) and few-shot learning.

12. The system of claim 11, wherein the semantic segmentation model is configured to perform a scene understanding task.

13. The system of claim 9, further comprising a video action recognition module to detect whether the one or more brand reference images appear in the video at a crucial moment.

14. The system of claim 13, wherein the video action recognition module is further configured to identify whether the one or more brand reference images appear in an area of a screen where a user's attention is focused.

15. The system of claim 9, further comprising a user interface to allow the user to label new brand reference images in the video frames for retraining the classification module.

16. The system of claim 15, wherein the user interface is further configured to allow the user to provide the new brand reference images for retraining the classification module.

* * * * *